(12) United States Patent
Henry et al.

(10) Patent No.: US 7,328,725 B2
(45) Date of Patent: Feb. 12, 2008

(54) REINFORCED HOSE

(75) Inventors: Ty A. Henry, Monroe, MI (US); Philip C. VanRiper, Holland, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/203,882

(22) Filed: Aug. 15, 2005

(65) Prior Publication Data

US 2007/0034275 A1    Feb. 15, 2007

(51) Int. Cl.
*F16L 11/00* (2006.01)
(52) U.S. Cl. .............. 138/124; 138/127; 138/134
(58) Field of Classification Search .......... 138/130, 138/125, 126, 124, 127, 134
See application file for complete search history.

(56) References Cited

U.S. PATENT DOCUMENTS

| | | | | |
|---|---|---|---|---|
| 3,566,924 A * | 3/1971 | Ambrus et al. | ............ | 138/130 |
| 4,343,333 A * | 8/1982 | Keister | ................ | 138/125 |
| 4,384,595 A * | 5/1983 | Washkewicz et al. | ....... | 138/127 |
| 4,522,235 A * | 6/1985 | Kluss et al. | ................ | 138/130 |
| 4,668,319 A * | 5/1987 | Piccoli | ................ | 156/149 |
| 5,275,209 A * | 1/1994 | Sugier et al. | ............... | 138/135 |
| 5,655,572 A * | 8/1997 | Marena | ...................... | 138/125 |
| 5,660,210 A * | 8/1997 | Ikeda et al. | ............... | 138/126 |
| 6,450,206 B2 * | 9/2002 | Ishikawa et al. | ........... | 138/126 |
| 6,626,211 B2 * | 9/2003 | Ogawa et al. | ............. | 138/126 |
| 6,631,742 B1 * | 10/2003 | Hagiwara et al. | .......... | 138/126 |
| 6,807,988 B2 * | 10/2004 | Powell et al. | .............. | 138/125 |
| 6,994,119 B2 * | 2/2006 | Mori | ......................... | 138/126 |
| 7,017,616 B2 * | 3/2006 | Ono et al. | .................. | 138/126 |

\* cited by examiner

*Primary Examiner*—James Hook
(74) *Attorney, Agent, or Firm*—Benesch, Friedlander, Coplan & Aronoff LLP

(57) ABSTRACT

A reinforced hose according to an embodiment of the present invention includes a first reinforcing layer having a reinforcement material with a first tensile strength. A second reinforcing layer overlays the first reinforcing layer and includes a reinforcement material with a second tensile strength. The second tensile strength is substantially greater than the first tensile strength. In another embodiment of the present invention, a reinforced hose includes a first reinforcing layer including a reinforcement material having a first level of fatigue resistance and a second reinforcing layer overlaying the first reinforcing layer and including a reinforcement material having a second level of fatigue resistance. The first level of fatigue resistance is substantially greater than the second level of fatigue resistance.

24 Claims, 3 Drawing Sheets

REINFORCED HOSE

BACKGROUND OF THE INVENTION

1. Field of the Invention

The present invention relates to a reinforced hose and to a reinforced hose having improved fatigue resistance and burst strength.

2. Description of the Related Art

High pressure reinforced hydraulic hose is typically used on a variety of fluid power operated machines, such as earth-moving machines, to provide a flexible connection between several moving parts of a hydraulic circuit employed on or within the machine. Such hoses often include a hollow polymeric inner tube on which successive cylindrical layers of reinforcing material, such as wire or textile, are concentrically applied to contain the radial and axial pressures developed within the inner tube. Many applications are demanding hose constructions with both high burst strength and long term fatigue resistance. Using conventional technology, the burst strength of a hose design may be increased by adding additional reinforcing material and/or layers-a practice generally discouraged because of its negative impact on the flexibility of the hose-or by universally increasing the tensile strength of each layer of reinforcement material-the latter coming at the expense of hose fatigue resistance.

SUMMARY OF THE INVENTION

A reinforced hose according to an embodiment of the present invention includes a first reinforcing layer having a reinforcement material with a first tensile strength. A second reinforcing layer overlays the first reinforcing layer and includes a reinforcement material with a second tensile strength. The second tensile strength is substantially greater than the first tensile strength. In another embodiment of the present invention, a reinforced hose includes a first reinforcing layer including a reinforcement material having a first level of fatigue resistance and a second reinforcing layer overlaying the first reinforcing layer and including a reinforcement material having a second level of fatigue resistance. The first level of fatigue resistance is substantially greater than the second level of fatigue resistance. Other aspects of the invention will be apparent to those skilled in the art after review of the drawings and detailed description provided below.

BRIEF DESCRIPTION OF THE DRAWINGS

Embodiments of the invention will now be described, by way of example, with reference to the accompanying drawings, wherein.

DETAILED DESCRIPTION

Figure 1:
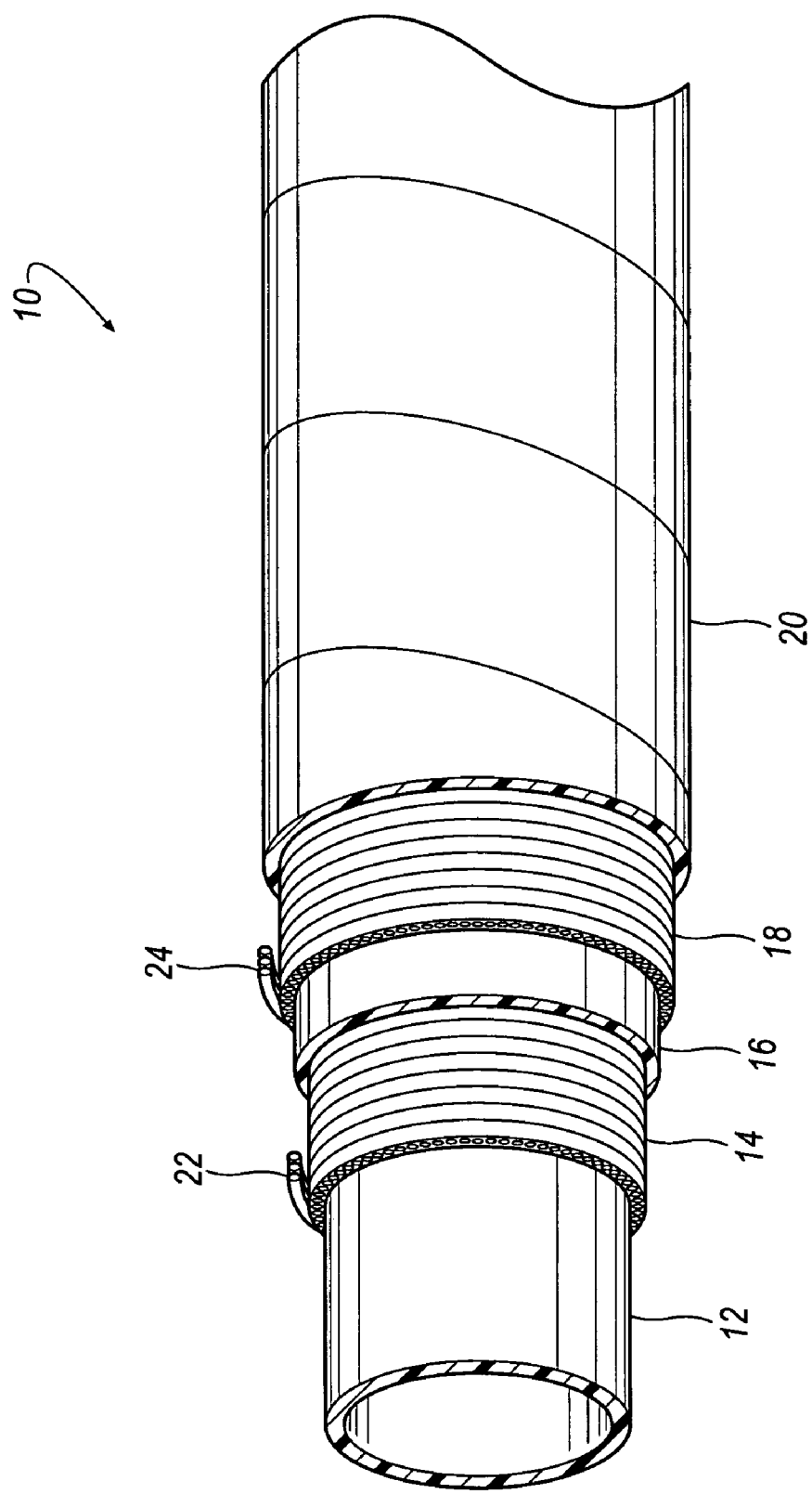
FIG. 1 is a perspective view, partly cut away, illustrating a hose according to an embodiment of the present invention.
Figure 2:
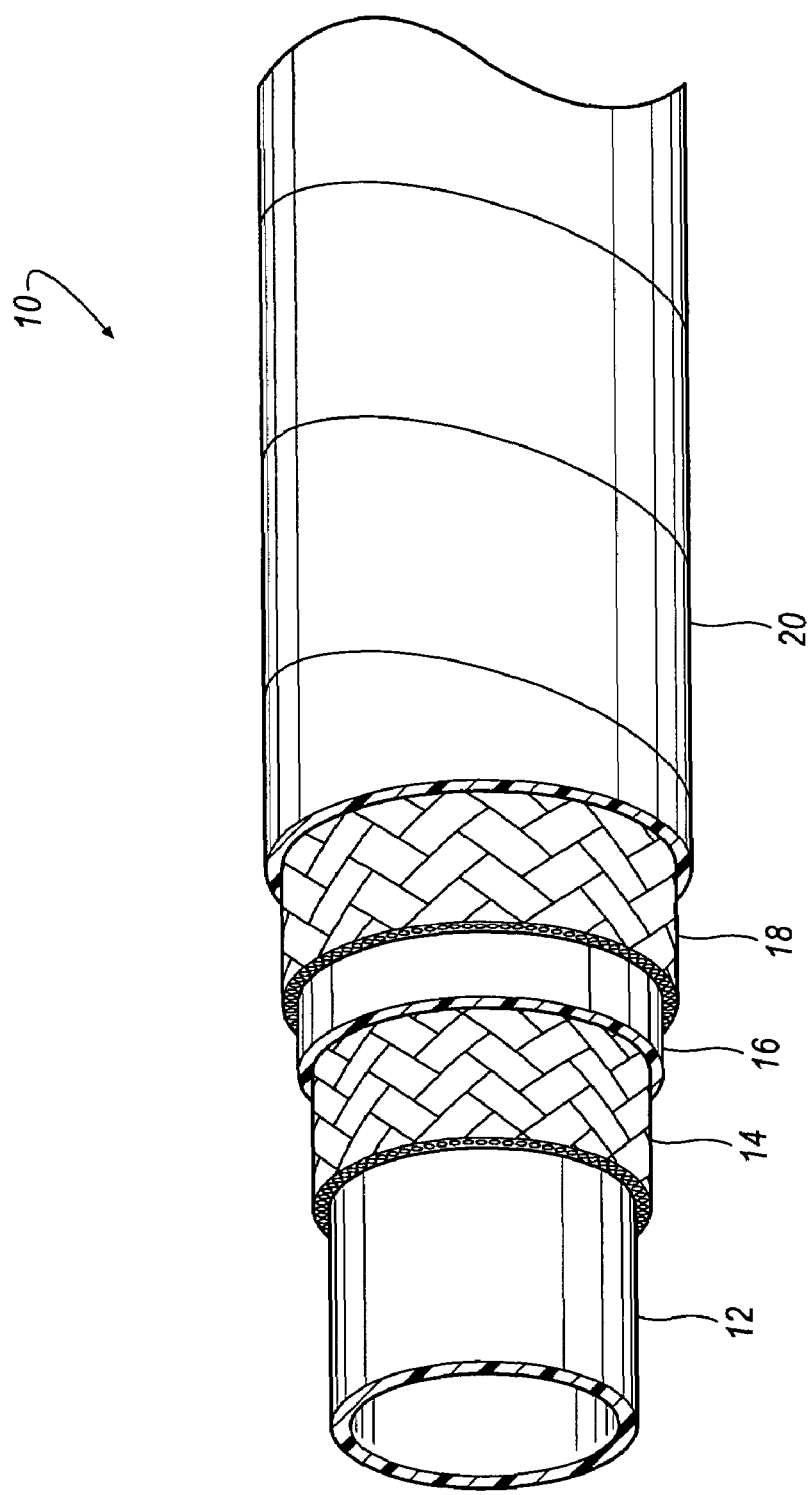
FIG. 2 is a perspective view, partly cut away, illustrating a hose according to another embodiment of the present invention.

Referring to FIGS. 1 and 2, a hose 10 according to an embodiment of the present invention is shown. Hose 10 is a multi-layer structure that includes a polymeric (e.g., rubber or plastic) inner tube 12, a first reinforcing layer 14 overlaying inner tube 12, an optional intermediate layer 16, a second reinforcing layer 18 overlaying first reinforcing layer 14 and intermediate layer 16, and an optional outer cover 20. Outer cover 20 may include, for example, an extruded layer of rubber or plastic, or may even comprise a reinforcing layer itself. Each of first and second reinforcing layers 14, 18 may include, for example, alternating layers of spiraled reinforcement material as shown in FIG. 1, or braided reinforcement material as shown in FIG. 2. Additionally, first and second reinforcing layers 14, 18 may include a single ply or multiple plies of reinforcement material. Each end 22, 24 of reinforcement material contained in first and second reinforcing layers 14, 18 may comprise metal wire, natural or synthetic fibers and textiles, and other reinforcement materials typically found in hose constructions. The use of terms "first" and "second" to describe reinforcing layers 14, 18 is not intended to limit or otherwise dictate the position or placement of reinforcing layers 14, 18 within hose 10.

To determine the robustness of a hose design, a hose manufacturer typically performs, among other tests, an impulse test and a burst test on the hose. An impulse test measures a hose design's resistance to fatigue failure by cyclically subjecting the hose to hydraulic pressure. A burst test, on the other hand, is a destructive hydraulic test employed to determine the ultimate strength of a hose by uniformly increasing internal pressure until failure. During development of the present invention, it was discovered that the highest load withstood by hose 10 during impulse testing was carried primarily by the reinforcing layer(s) closest to inner tube 12, e.g., first reinforcing layer 14. It was also discovered that the highest load withstood by hose 10 during burst testing was carried primarily by the outermost reinforcing layer(s), e.g., second reinforcing layer 18.

To improve the robustness of their hose design, the inventors of the present invention proposed employing a reinforcement material in first reinforcing layer 14 that was more ductile and less prone to fatigue failure than the reinforcement material in second reinforcing layer 18. For example, in the embodiments illustrated in FIGS. 1 and 2, first reinforcing layer 14 includes at least one end of reinforcement material 22 having a first tensile strength and second reinforcing layer 18 includes at least one end of reinforcement material 24 having a second tensile strength. Prior to implementing this design, individual ends of the proposed reinforcement material were tested to determine their ultimate load carrying capability and fatigue resistance. The results of this test are included below:

| Reinforcement Testing | | | |
| --- | --- | --- | --- |
| Reinforcement Material | Ultimate Load | Cycling Load | Load Cycles to Failure |
| 0.71 mm High Tensile Steel Wire; Nominal Tensile Strength: 2900 N/mm² | 1084.6 N | 496 N | 300,454 |
| 0.71 mm Steel Wire; Nominal Tensile Strength: 2600 N/mm² | 1024.3 N | 496 N | 819,485 |
| 0.80 mm Steel Wire; Nominal Tensile Strength: 2300 N/mm² | 1118 N | 550 N | 2,000,000 (test stopped after no failure) |

The fatigue testing results show that, between two individual ends of steel wire with the same diameter (e.g., 0.71 mm), the lower tensile strength material exhibits a significantly greater resistance to fatigue, while the higher tensile strength material is able to support a higher ultimate load. Notably, an even more dramatic improvement in fatigue resistance may be obtain by further decreasing the nominal tensile strength of the material (e.g., nominal tensile strength of 2300 N/mm$^2$). To counteract the reduction in ultimate load capacity of the material, the material diameter may be increased. Thus, when compared to 0.71 mm high tensile steel wire with a nominal tensile strength of 2900 N/mm$^2$, 0.08 mm diameter steel wire with a nominal tensile strength of 2300 N/mm$^2$ exhibits a significantly greater resistance to fatigue and can withstand a higher load prior to failure.

Figure 3:
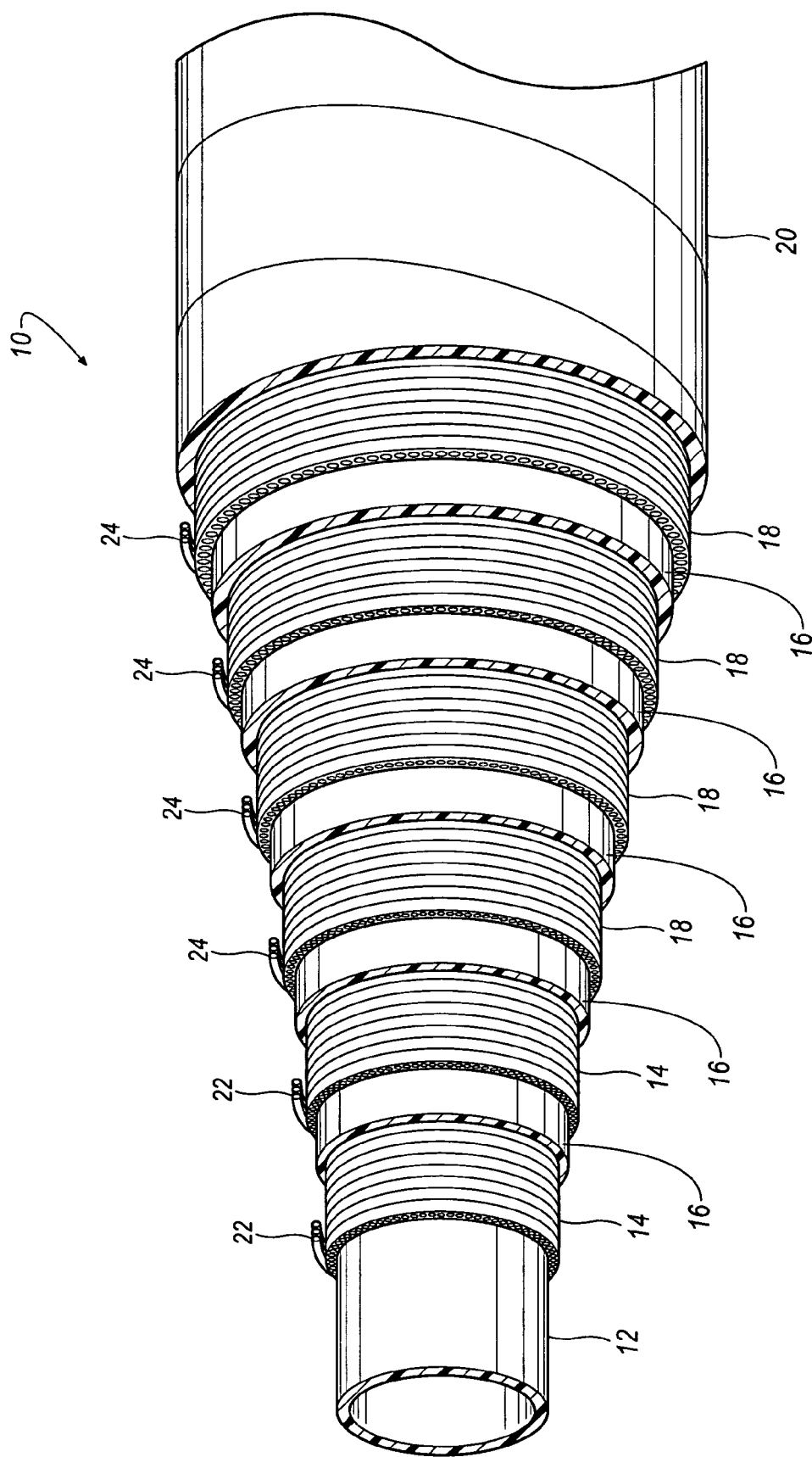
FIG. 3 is a perspective view, partly cut away, illustrating a hose according to another embodiment of the present invention.

To illustrate the performance of the present invention, a hose 10 according to an embodiment of the present invention is shown in FIG. 3 that includes a number of first reinforcing layers 14 having a reinforcement material 22 with a first tensile strength and a first diameter. First reinforcing layers 14 are provided adjacent inner tube 12 and a number of second reinforcing layers 18 overlay first reinforcing layers 14. Second reinforcing layers 18 include at a reinforcement material 24 having a second tensile strength and a second diameter. An example hose construction according to the embodiment shown in FIG. 3 and a conventional hose construction are provided for comparison as follows:

Example Hose Constructions

| | Hose According to an Embodiment of the Present Invention | Comparative Hose Construction |
|---|---|---|
| Inner tube | Rubber | Rubber |
| Inner Reinforcing Layer | 128 Ends of Spiral Wound 0.80 mm Steel Wire; Nominal Tensile Strength: 2300 N/mm$^2$ | 145 Ends of Spiral Wound 0.71 mm Steel Wire; Nominal Tensile Strength: 2600 N/mm$^2$ |
| Intermediate Layer | Rubber | Rubber |
| Reinforcing Layer #2 | 130 Ends of Spiral Wound 0.80 mm Steel Wire; Nominal Tensile Strength: 2300 N/mm$^2$ | 145 Ends of Spiral Wound 0.71 mm Steel Wire; Nominal Tensile Strength: 2600 N/mm$^2$ |
| Intermediate Layer | Rubber | Rubber |
| Reinforcing Layer #3 | 146 Ends of Spiral Wound 0.71 mm Steel Wire; Nominal Tensile Strength: 2600 N/mm$^2$ | 146 Ends of Spiral Wound 0.71 mm Steel Wire; Nominal Tensile Strength: 2600 N/mm$^2$ |
| Intermediate Layer | Rubber | Rubber |
| Reinforcing #4 | 148 Ends of Spiral Wound 0.71 mm Steel Wire; Nominal Tensile Strength: 2600 N/mm$^2$ | 148 Ends of Spiral Wound 0.71 mm Steel Wire; Nominal Tensile Strength: 2600 N/mm$^2$ |
| Intermediate Layer | Rubber | Rubber |
| Reinforcing #5 | 149 Ends of Spiral Wound 0.71 mm Steel Wire; Nominal Tensile Strength: 2600 N/mm$^2$ | 149 Ends of Spiral Wound 0.71 mm Steel Wire; Nominal Tensile Strength: 2600 N/mm$^2$ |
| Intermediate Layer | Rubber | Rubber |
| Outer Reinforcing Layer | 150 Ends of Spiral Wound 0.71 mm Steel Wire; Nominal Tensile Strength: 2600 N/mm$^2$ | 150 Ends of Spiral Wound 0.71 mm Steel Wire; Nominal Tensile Strength: 2600 N/mm$^2$ |
| Outer Cover | Rubber | Rubber |

The above-described hose constructions were impulse and burst tested and the results are compared as follows:

Hose Testing

| Hose Construction | Sample | Number of Cycles to Failure | Burst Test |
|---|---|---|---|
| Hose Construction According to an Embodiment of the Present Invention | 1 | 2,000,290* | Passed |
| | 2 | 2,000,290* | Passed |
| | 3 | 2,000,290* | Passed |
| | 4 | 2,000,290* | Passed |
| | 5 | 2,000,290* | Passed |
| | 6 | 2,000,290* | Passed |
| Comparative Hose Construction | 1 | 87,532** | Passed |
| | 2 | 139,653† | Passed |
| | 3 | 47,038** | Passed |
| | 4 | 180,649† | Passed |
| | 5 | 35,991** | Passed |
| | 6 | 180,649† | Passed |

*Test stopped after no failure.
**Failure not necessarily related to hose construction.
†Failure related to hose construction.

The results of the show that hose construction according to an embodiment of the present invention exhibits a significantly greater fatigue resistance than the comparative hose construction. The test are directly attributable to the inner reinforcing layer and reinforcing layer #2 having a reinforcement material with a substantially lower tensile strength than the reinforcement material contained in the outer four reinforcing layers.

As will be appreciated, the present invention is not limited to hose constructions that included six layers of spiraled reinforcement or even spiraled reinforcement at all. Indeed, the present invention includes hose constructions having braided reinforcing layers (see, e,g, FIG. 2), combinations of spiraled and reinforcing layers, and other reinforcing layers.

It will also be appreciated that reinforcement materials having similar tensile strengths, but substantially different levels of fatigue resistance may also be employed in hose 10. For example, while first and second reinforcing layers 14, 18 may include reinforcement materials having similar tensile strengths, the first reinforcing layer material may have a level of fatigue resistance substantially greater than the level of fatigue resistance exhibited by the second reinforcing layer material.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A reinforced hose (10) comprising:
   a first reinforcing layer (14) including a reinforcement material having a first tensile strength;

a second reinforcing layer (18) overlaying the first reinforcing layer (14) and including a reinforcement material having a second tensile strength; and wherein the second tensile strength is substantially greater than the first tensile strength and the reinforcing material of both the first and second reinforcing layers is steel wire that is formed from the same type of steel.

2. The reinforced hose (10) of claim 1, further comprising an inner tube (12) and an outer cover (20), wherein the first reinforcing layer (14) is nearer the inner tube (12) than the second reinforcing layer (18).

3. The reinforced hose (10) of claim 1, wherein the first tensile strength is about 2300 N/mm$^2$.

4. The reinforced hose (10) of claim 1, wherein the second tensile strength is about 2600-2900 N/mm$^2$.

5. The reinforced hose (10) of claim 1, wherein at least one of the first and second reinforcing layers (14, 18) is spiral-wound.

6. The reinforced hose (10) of claim 1, wherein at least one of the first and second reinforcing layers (14, 18) is braided.

7. The reinforced hose (10) of claim 1, wherein the steel wire reinforcing material in the first reinforcing layer (14) has a diameter substantially greater than a diameter of the steel wire reinforcing material in the second reinforcing layer (18).

8. The reinforced hose (10) of claim 1, wherein the hose (10) includes an intermediate layer (16) positioned between the first and second reinforcing layers (14, 18) and an outer cover (20) overlaying the second reinforcing layers (18).

9. The reinforced hose (10) of claim 1, wherein each of the first and second reinforcing layers (14, 18) include a single reinforcement material.

10. The reinforced hose (10) of claim 1, wherein the first and second reinforcing layers (14, 18) include a single ply or multiple plies of reinforcement material.

11. A reinforced hose (10) comprising:
a number of first reinforcing layers (14) including a steel wire reinforcement material having a first tensile strength and a first diameter;
a number of second reinforcing layers (18) overlaying the first reinforcing layers (14) and including a steel wire reinforcement material having a second tensile strength and a second diameter; and
wherein the second tensile strength is substantially greater than the first tensile strength and the first diameter is substantially greater than the second diameter,
wherein the steel wire reinforcement material of the first layers (14) and the steel wire reinforcement material of the second layers (18) is formed from the same type of steel.

12. The reinforced hose (10) of claim 11, wherein the first tensile strength is about 2300 N/mm$^2$.

13. The reinforced hose (10) of claim 11, wherein the second tensile strength is around 2600-2900 N/mm$^2$.

14. The reinforced hose (10) of claim 11, wherein at least one of the first and second reinforcing layers (14, 18) is spiral-wound.

15. The reinforced hose (10) of claim 11, wherein at least one of the first and second reinforcing layers (14, 18) is braided.

16. The reinforced hose (10) of claim 11, wherein an intermediate layer (16) is positioned between the first and second reinforcing layers (14, 18).

17. The reinforced hose (10) of claim 11, wherein the number of first and second reinforcing layers (14, 18) is at least two.

18. The reinforced hose (10) of claim 11, wherein the first and second reinforcing layers (14, 18) include a single ply or multiple plies of reinforcement material.

19. A reinforced hose (10) comprising:
a first reinforcing layer (14) including a reinforcement material having a first level of fatigue resistance;
a second reinforcing layer (18) overlaying the first reinforcing layer (14) and including a reinforcement material having a second level of fatigue resistance; and
wherein the first level of fatigue resistance is substantially greater than the second level of fatigue resistance and the reinforcing material of both the first and second reinforcing layers is steel wire that is formed from the same type of steel.

20. The reinforced hose (10) of claim 19, wherein at least one of the first and second reinforcing layers (14, 18) is spiral-wound or braided.

21. The reinforced hose (10) of claim 19, wherein at least one end (22) of reinforcing material in the first reinforcing layer (14) has a diameter substantially greater than a diameter of at least one end (24) of reinforcing material in the second reinforcing layer (18).

22. The reinforced hose (10) of claim 19, wherein each of the first and second reinforcing layers (14, 18) include a single reinforcement material.

23. The reinforced hose (10) of claim 19, wherein the first and second reinforcing layers (14, 18) include a single ply or multiple plies of reinforcement material.

24. A method of manufacturing a reinforced hose (10) comprising the steps of:
providing an inner tube (12);
applying a first reinforcing layer (14) over the inner tube (12), the first reinforcing layer (14) including a reinforcement material having a first tensile strength; and
applying a second reinforcing layer (18) over the first reinforcing layer (14), the second reinforcing layer (18) including a reinforcement material having a second tensile strength substantially greater than the first tensile strength, wherein the reinforcing material of both the first and second reinforcing layers is steel wire that is formed from the same type of steel.

* * * * *